United States Patent
Shepelev

(10) Patent No.: US 10,228,805 B2
(45) Date of Patent: Mar. 12, 2019

(54) DETERMINING THICKNESS PROFILES FOR A DIELECTRIC LAYER WITHIN AN INPUT DEVICE

(71) Applicant: SYNAPTICS INCORPORATED, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 87 days.

(21) Appl. No.: 15/349,234

(22) Filed: Nov. 11, 2016

(65) Prior Publication Data

US 2017/0139505 A1    May 18, 2017

Related U.S. Application Data

(60) Provisional application No. 62/254,665, filed on Nov. 12, 2015.

(51) Int. Cl.
*G06F 3/041* (2006.01)
*G06F 3/044* (2006.01)

(52) U.S. Cl.
CPC ............ *G06F 3/044* (2013.01); *G06F 3/0414* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 5,510,813 A | 4/1996 | Makinwa et al. | |
| 5,942,733 A | 8/1999 | Allen et al. | |
| 5,943,044 A | 8/1999 | Martinelli et al. | |
| 6,002,389 A | 12/1999 | Kasser | |
| 7,154,481 B2 | 12/2006 | Cross et al. | |
| 7,215,329 B2 | 5/2007 | Yoshikawa et al. | |
| 7,395,717 B2 | 7/2008 | DeAngelis et al. | |
| 7,538,760 B2 | 5/2009 | Hotelling et al. | |
| 7,825,911 B2 | 11/2010 | Sano et al. | |

(Continued)

FOREIGN PATENT DOCUMENTS

WO   WO-20140164628 A1   10/2014

OTHER PUBLICATIONS

International Search Report and Written Opinion PCT/US2016/061352, dated Feb. 21, 2017 consists of 11 pages.

(Continued)

*Primary Examiner* — Ifedayo B Iluyomade
(74) *Attorney, Agent, or Firm* — Patterson + Sheridan, LLP

(57) ABSTRACT

An input device and related method and processing system are disclosed. The input device comprises a sensing assembly attached with a conductive reference element, the sensing assembly comprising a plurality of sensor electrodes capacitively coupled with the conductive reference element and defining a surface. The input device further comprises a switching element configured to couple the conductive reference element with a selected one of a plurality of reference voltages. A first capacitive measurement is acquired while the conductive reference element is coupled with a first reference voltage, and a second capacitive measurement is acquired while the conductive reference element is coupled with a second reference voltage.

26 Claims, 8 Drawing Sheets

(56) References Cited

U.S. PATENT DOCUMENTS

| | | |
|---|---|---|
| 8,063,886 B2 | 11/2011 | Serban et al. |
| 8,607,651 B2 | 12/2013 | Eventoff |
| 8,627,716 B2 | 1/2014 | Son |
| 8,686,952 B2 | 4/2014 | Burrough et al. |
| 8,730,199 B2 | 5/2014 | Sleeman et al. |
| 8,857,274 B2 | 10/2014 | Mamigonians |
| 9,075,095 B2 | 7/2015 | Kallassi et al. |
| 2004/0090429 A1 | 5/2004 | Geaghan et al. |
| 2006/0260417 A1 | 11/2006 | Son et al. |
| 2007/0229464 A1 | 10/2007 | Hotelling et al. |
| 2007/0236466 A1 | 10/2007 | Hotelling |
| 2008/0174321 A1 | 7/2008 | Kang et al. |
| 2010/0242629 A1 | 9/2010 | Leuenberger et al. |
| 2010/0253651 A1 | 10/2010 | Day |
| 2010/0282000 A1 | 11/2010 | Gorjanc et al. |
| 2011/0007023 A1 | 1/2011 | Abrahamsson et al. |
| 2011/0096025 A1 | 4/2011 | Slobodin et al. |
| 2011/0141053 A1 | 6/2011 | Bulea et al. |
| 2011/0227872 A1 | 9/2011 | Huska et al. |
| 2011/0278078 A1 | 11/2011 | Schediwy et al. |
| 2012/0013573 A1 | 1/2012 | Liu et al. |
| 2012/0025876 A1 | 2/2012 | Kimura |
| 2012/0038583 A1 | 2/2012 | Westhues et al. |
| 2012/0062245 A1 | 3/2012 | Bao et al. |
| 2012/0098783 A1 | 4/2012 | Badaye et al. |
| 2012/0105367 A1 | 5/2012 | Son et al. |
| 2012/0299866 A1 | 11/2012 | Pao et al. |
| 2013/0009905 A1* | 1/2013 | Castillo ............... G06F 3/044 345/174 |
| 2013/0047747 A1 | 2/2013 | Joung |
| 2013/0076646 A1 | 3/2013 | Krah et al. |
| 2013/0234977 A1 | 9/2013 | Lin et al. |
| 2014/0028575 A1 | 1/2014 | Parivar et al. |
| 2014/0055407 A1 | 2/2014 | Lee et al. |
| 2014/0062934 A1 | 3/2014 | Coulson et al. |
| 2014/0062937 A1 | 3/2014 | Schwartz et al. |
| 2014/0085213 A1 | 3/2014 | Huppi et al. |
| 2014/0085247 A1 | 3/2014 | Leung et al. |
| 2014/0247239 A1 | 9/2014 | Jamshidi-Roudbari et al. |
| 2014/0267128 A1 | 9/2014 | Bulea et al. |
| 2014/0307186 A1 | 10/2014 | Yun et al. |
| 2015/0002447 A1 | 1/2015 | Schediwy |
| 2015/0009171 A1 | 1/2015 | Shepelev |
| 2015/0015475 A1 | 1/2015 | Ely et al. |
| 2015/0070285 A1 | 3/2015 | Qiu |
| 2015/0084909 A1 | 3/2015 | Worfolk et al. |
| 2016/0085336 A1* | 3/2016 | Kim ................. G06F 3/044 345/174 |

OTHER PUBLICATIONS

U.S. Appl. No. 14/871,497, Entitled: "Force Sensor Substrate" filed Sep. 30, 2015.

U.S. Appl. No. 14/871,346, Entitled: "Sensing Force Using Transcapacitance With Dedicated Force Receiver Electrodes" filed Sep. 30, 2015.

U.S. Appl. No. 15/135,505, Entitled: "Force Sensor Substrate" filed Apr. 21, 2016.

U.S. Appl. No. 15/080,146, Entitled: "Adaptive Force Sensor" filed Mar. 24, 2016.

U.S. Appl. No. 15/057,005, Entitled: "Adaptive Mechanical Change Compensation for Force Detector" filed Feb. 29, 2016.

U.S. Appl. No. 15/199,421, Entitled: "Compensating Force Baseline Artifacts in a Capacitive Sensor" filed Jun. 30, 2016.

U.S. Appl. No. 15/199,464, Entitled: "Force Sensing Within Display Stack" filed Jun. 30, 2016.

U.S. Appl. No. 14/986,088, Entitled: "Estimating Force Applied by an Input Object to a Touch Sensor" filed Dec. 31, 2015.

U.S. Appl. No. 15/088,026, Entitled: "Combining Trans-Capacitance Data With Absolute-Capacitance Data for Touch Force Estimates" filed Apr. 31, 2015.

U.S. Appl. No. 15/199,333, Entitled: "Force Sensing in a Touch Display" filed Jun. 30, 2016.

U.S. Appl. No. 15/083,187, Entitled: "Inflection Based Calibration Method for Force Detector" filed Mar. 28, 2016.

U.S. Appl. No. 15/088,011, Entitled: "Per-Finger Force Detection Using Segmented Sensor Electrodes" filed Mar. 31, 2016.

U.S. Appl. No. 15/199,307, Entitled: "Detecting Applied Forces on a Display" filed Jun. 30, 2016.

U.S. Appl. No. 15/143,476, Entitled: "Hybrid Capacitive and Resistive Sensing for Force and Touch" filed Apr. 29, 2016.

U.S. Appl. No. 15/199,371, Entitled: "Combined Force and Touch Sensor" filed Jun. 30, 2016.

U.S. Appl. No. 15/199,455, Entitled: "Transcapacitive Touch and Force Sensing in an Input Device" filed Jun. 30, 2016.

U.S. Appl. No. 15/332,822, Entitled: "Simultaneous ITO Sensing for Touch and Force" filed Oct. 24, 2016.

Hughes, Neil. 'Force Touch for iPhone expected to bring about most significant change yet to IOS user interface'. In appleinsider [online]. Apr. 2, 2015; Retrived from the Internet: <URL: http://appleinsider.com/articles/15/04/02/force-touch-for-iphone-expected-to-bring-about-mostsignificant-change-to-ios-user-interface-yet>. See pp. 1-2; and figure 2.

International Search Report and Written Opinion PCT/US2016/028307, dated Jul. 29, 2016 consists of 17 pages.

International Preliminary Report on Patentability, PCT/US2016/061352, dated May 24, 2018, consists of 8 pages.

* cited by examiner

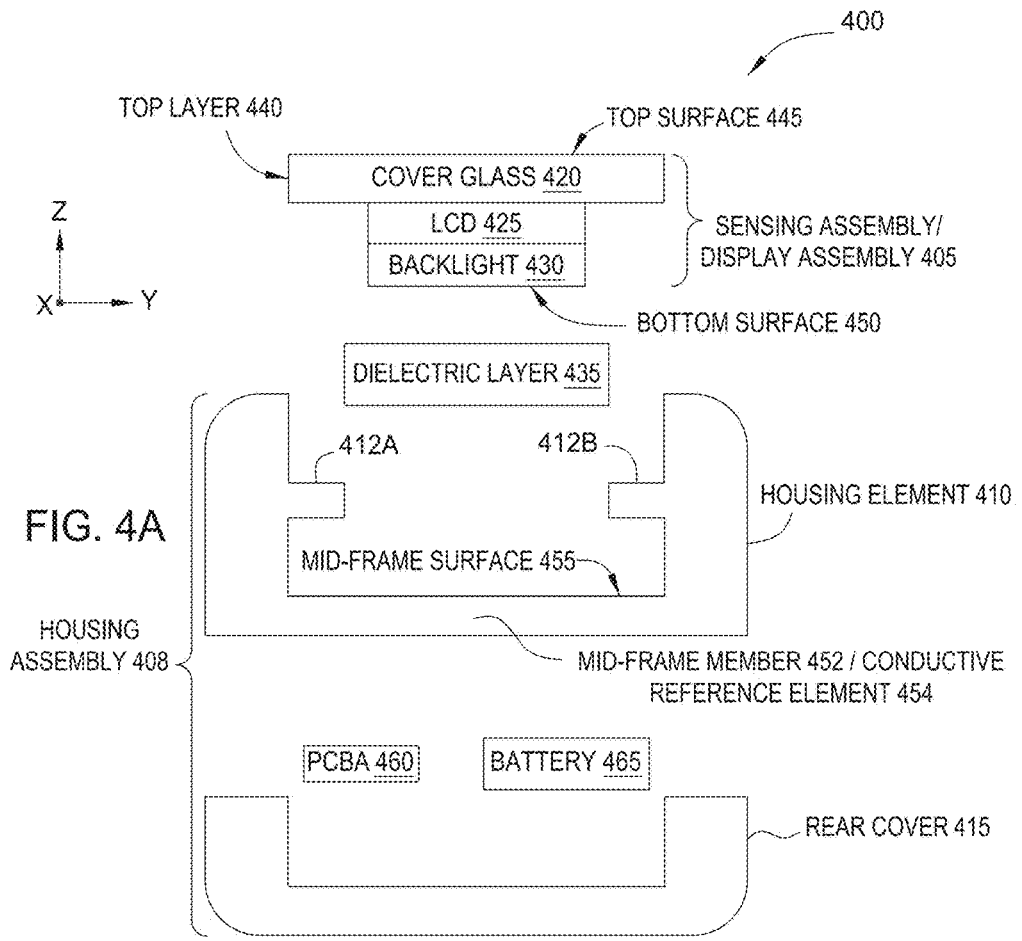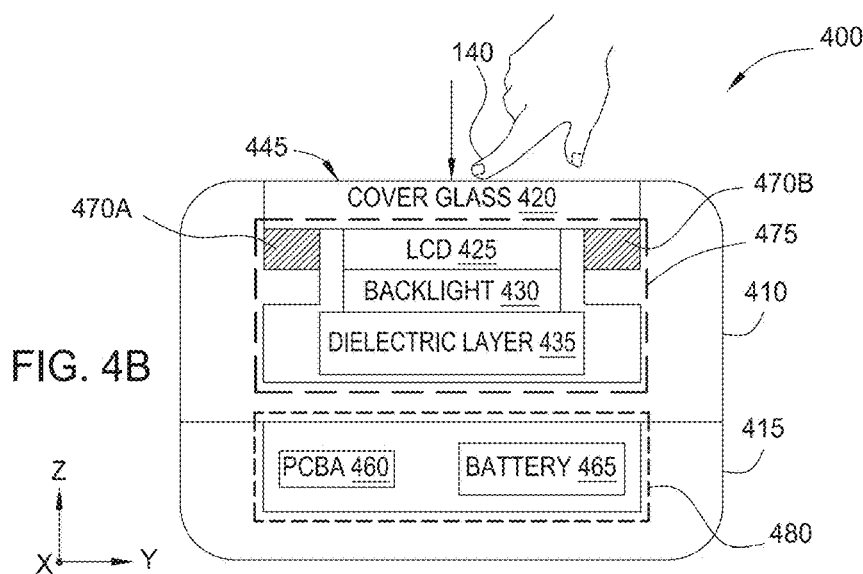

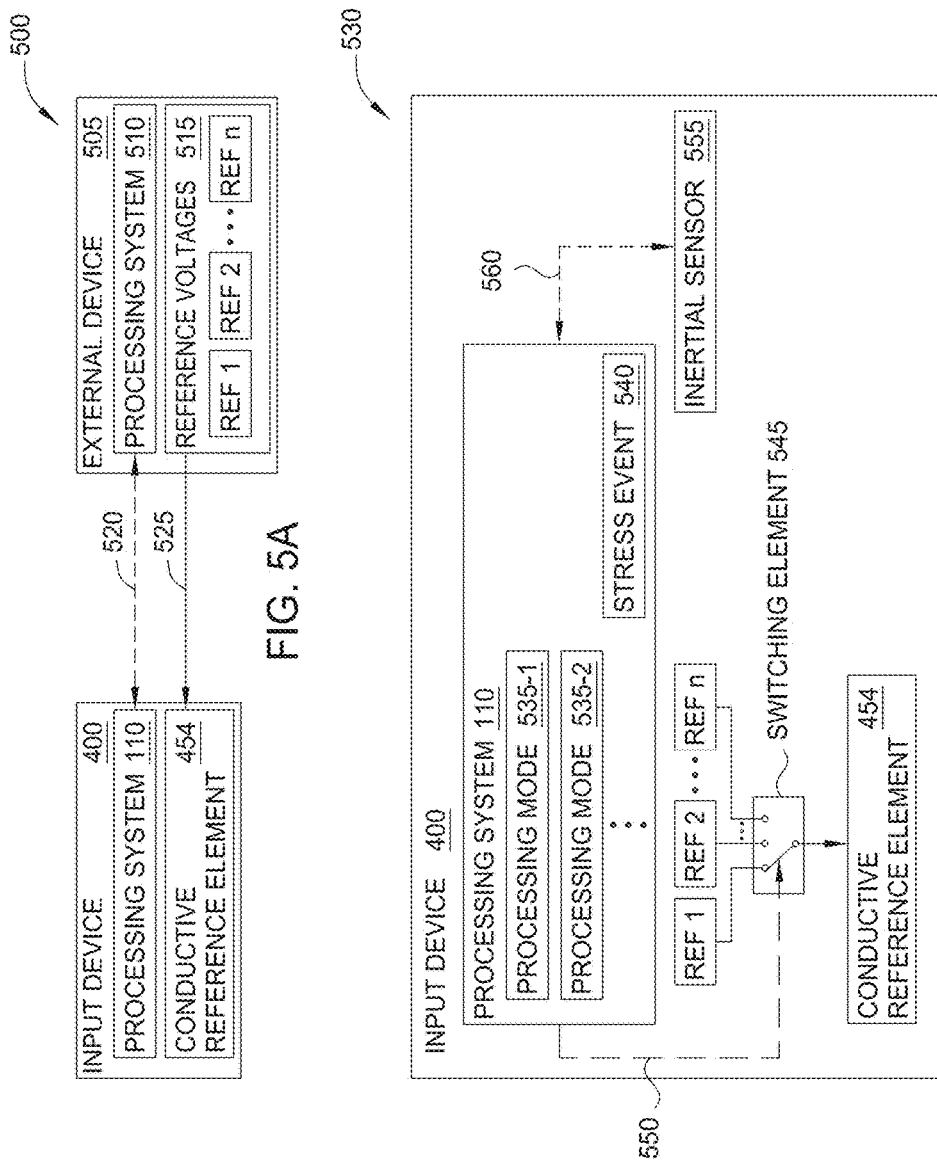

DETERMINING THICKNESS PROFILES FOR A DIELECTRIC LAYER WITHIN AN INPUT DEVICE

CROSS-REFERENCE TO RELATED APPLICATIONS

This application claims benefit of U.S. provisional patent application Ser. No. 62/254,665, filed Nov. 12, 2015 entitled "Device Tuning For a Force Sensor", which is herein incorporated by reference in its entirety.

BACKGROUND

Field

Embodiments disclosed herein generally relate to electronic devices, and more specifically, techniques for determining a thickness profile of a dielectric layer disposed between a sensing assembly and a conductive reference element of an electronic input device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is an input device comprising a sensing assembly attached with a conductive reference element. The sensing assembly comprises a plurality of sensor electrodes capacitively coupled with the conductive reference element and defines a surface. The input device further comprises a switching element configured to couple the conductive reference element with a selected one of a plurality of reference voltages, and a processing system configured to acquire, while the switching element couples the conductive reference element with a first reference voltage of the plurality of reference voltages, a baseline capacitive measurement using the plurality of sensor electrodes. The processing system is further configured to perform, while the switching element couples the conductive reference element with a second reference voltage of the plurality of reference voltages, and based on the baseline capacitive measurement, capacitive sensing using the plurality of sensor electrodes to thereby determine a deflection of the sensing assembly in response to force applied to the surface.

Another embodiment described herein is a method performed in conjunction with an input device comprising a sensing assembly attached with a conductive reference element. The sensing assembly comprises a plurality of sensor electrodes capacitively coupled with the conductive reference element. The method comprises acquiring, while the conductive reference element is coupled with a first reference voltage, a first capacitive measurement using the plurality of sensor electrodes. The method further comprises acquiring, while the conductive reference element is coupled with a second reference voltage different than the first reference voltage, a second capacitive measurement using the plurality of sensor electrodes. The method further comprises determining, based on the first capacitive measurement and the second capacitive measurement, a thickness profile of a dielectric layer disposed between the sensing assembly and the conductive reference element.

Another embodiment described herein is a processing system for an input device. The processing system comprises a sensing module comprising sensing circuitry configured to couple with a plurality of sensor electrodes of a sensing assembly, the sensor electrodes capacitively coupled with a conductive reference element of the input device. The sensing module is configured to acquire, while the conductive reference element is coupled with a first reference voltage, a first capacitive measurement using the plurality of sensor electrodes. The sensing module is further configured to acquire, while the conductive reference element is coupled with a second reference voltage different than the first reference voltage, a second capacitive measurement using the plurality of sensor electrodes. The sensing module is further configured to determine, based on the first capacitive measurement and the second capacitive measurement, a thickness profile of a dielectric layer disposed between the sensing assembly and the conductive reference element.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 4A and 4B illustrate an exemplary input device including a sensing assembly, according to embodiments described herein.

FIGS. 5A and 5B illustrate exemplary implementations for applying a selected reference voltage to a conductive reference element, according to embodiments described herein.

Figure 1:
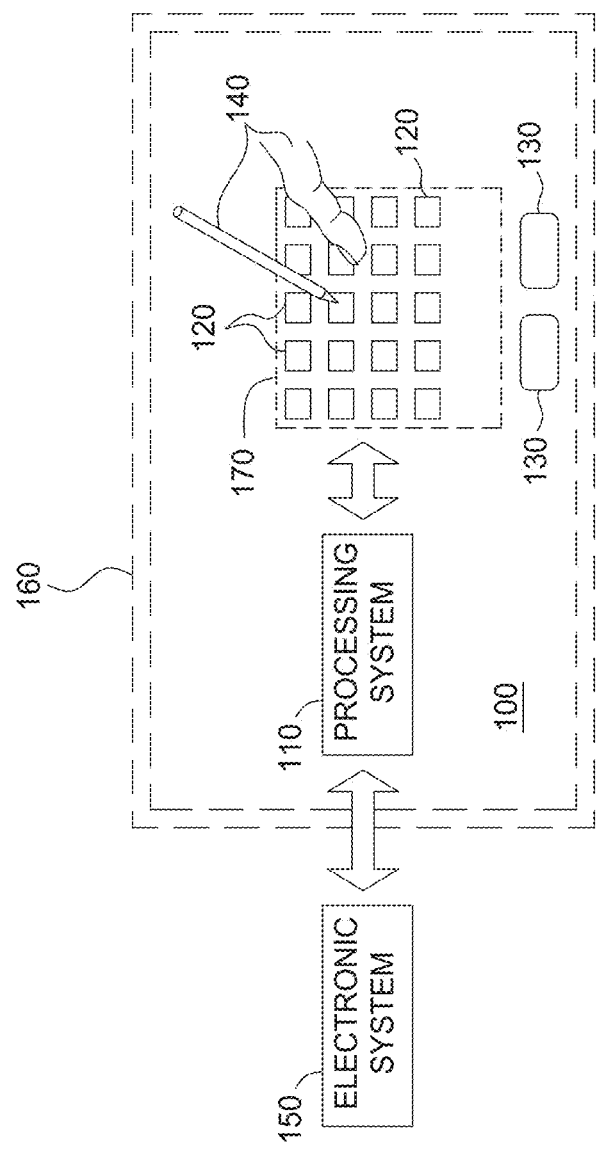
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present technology provide input devices and methods for improving usability. An input device may include electrodes that are operated as sensor electrodes to detect interaction between the input device and an input object (e.g., a stylus or a user's finger).

Within an input device, the accuracy of force sensing measurements generally depends on how well sensor electrode layer (and other layer) thicknesses are controlled, as well as the mechanical accuracy of the mounting of the various layers relative to other conductive elements of the input device. These parameters generally vary between different input devices, and may also change over time. In various embodiments described herein, a thickness profile of the dielectric layer may be determined that reflects the parameters. The thickness profile may generally be used to compensate force measurements acquired using the sensor electrodes, and/or to independently perform force measurements. In some embodiments, the thickness profile is determined based on capacitive measurements acquired using the sensing electrodes while a conductive reference element is coupled with a selected reference voltage.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Arrangements

Figure 2:
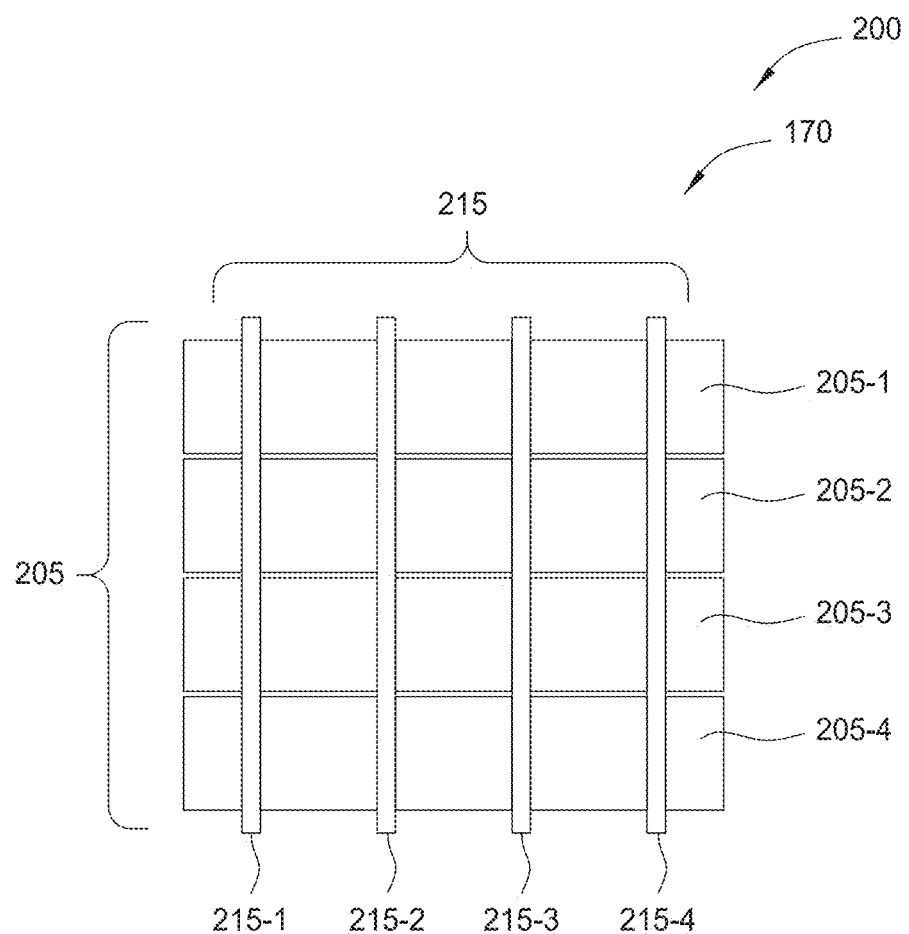
FIGS. 2 and 3 illustrate portions of exemplary sensor electrode arrangements, according to embodiments described herein.
Figure 3:
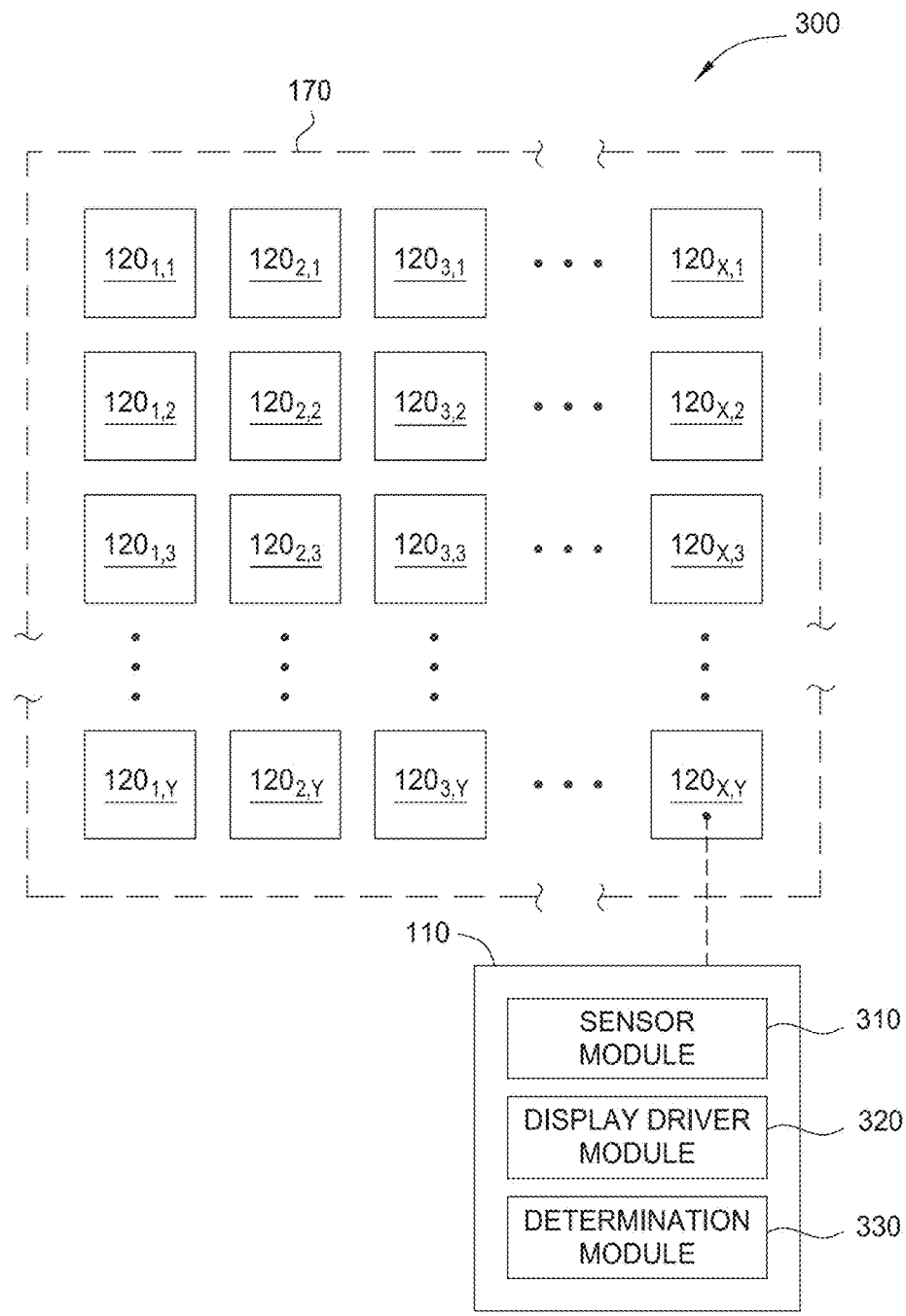

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other arrangements of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable arrangement. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, . . . , $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, . . . , $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor module 310 and optionally, a display driver module 320. The sensor module 310 includes circuitry configured to drive at least one of the sensor electrodes 120 for capacitive sensing during periods in which input sensing is desired. In one embodiment, the sensor module 310 is configured to drive a modulated signal onto the at least one sensor electrode 120 to detect changes in absolute capacitance between the at least one sensor electrode and an input object. In another embodiment, the sensor module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 310 may be selectively coupled one or more of the sensor electrodes 120 and/or the grid electrode(s). For example, the sensor module 310 may be coupled selected portions of the sensor electrodes 120 and operate in either an absolute or transcapacitive sensing mode. In another example, the sensor module 310 may be a different portion of the sensor electrodes 120 and operate in either an absolute or transcapacitive sensing mode. In yet another example, the sensor module 310 may be coupled to all the sensor electrodes 120 and operate in either an absolute or transcapacitive sensing mode.

The sensor module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 310 and display driver module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 310 includes circuitry configured to receive resulting signals with the sensor electrodes 120 and/or grid electrode(s) comprising effects corresponding to the modulated signals or the transmitter signals during periods in which input sensing is desired. The sensor module 310 may determine a position of the input object in the sensing region 170 or may provide a signal including information indicative of the resulting signal to another module or processor, for example, a determination module 330 or a processor of an associated electronic device 150 (i.e., a host processor), for determining the position of the input object in the sensing region 170.

The display driver module 320 may be included in or separate from the processing system 110. The display driver module 320 includes circuitry configured to provide display image update information to the display of the display device 160 during non-sensing (e.g., display updating) periods.

In one embodiment, the processing system 110 comprises a first integrated controller comprising the display driver module 320 and at least a portion of the sensor module 310 (i.e., transmitter module and/or receiver module). In another embodiment, the processing system 110 comprises a first integrated controller comprising the display driver module 320 and a second integrated controller comprising the sensor module 310. In yet another embodiment, the processing system comprises a first integrated controller comprising display driver module 320 and a first portion of the sensor module 310 (e.g., one of a transmitter module and a receiver module) and a second integrated controller comprising a second portion of the sensor module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Exemplary Force Sensing Arrangements

FIGS. 4A and 4B illustrate an exemplary input device including a sensing assembly, according to embodiments described herein. More specifically, FIG. 4A illustrates various components of an input device 400 in an exploded cross-sectional view, and FIG. 4B illustrates the input device 400 as assembled or formed. Some non-limiting examples of the input device 400 include a smartphone, tablet, and other mobile computing devices. Further, the components depicted within input device 400 are not drawn to scale.

The input device 400 comprises a sensing assembly 405 comprising a plurality of layers. Generally, the sensing assembly 405 comprises a plurality of sensor electrodes according to the sensor electrode implementations discussed above with respect to FIGS. 2 and 3. As discussed above, the plurality of sensor electrodes may be distributed among one or more of the layers. For example, the plurality of sensor electrodes may be arranged within a single plane that is substantially parallel to the X-Y plane (i.e., at a single Z value) or arranged within two or more substantially parallel planes (i.e., having different Z values).

In some embodiments, the sensing assembly 405 comprises a display assembly comprising a plurality of display electrodes. As shown, a cover glass layer 420 comprises a top layer 440 of the sensing assembly 405, and is coupled with a LCD layer 425 and a backlight layer 430. For simplicity, other display and/or sensing-related layers or substrates are not shown. While the sensing assembly 405 includes separate layers (or substrates) for cover glass layer 420 and for LCD layer 425, it will be noted that a number of other suitable display architectures may be used as an alternative to LCD layer 425. Further, alternate arrangements of the plurality of layers are possible. For example, additional display or sensing-related layers (such as a force sensing substrate comprising additional sensor electrodes) and/or fewer layers are possible.

The input device 400 further comprises a housing assembly 408 coupled with the sensing assembly 405. The housing assembly 408 comprises a housing element 410 configured to support and/or retain the sensing assembly 405 within the input device 400. The housing element 410 is generally formed of any material(s) having suitable strength to retain the sensing assembly 405, which in some cases can be selected to protect the input device 400 from drops or other impacts. In some embodiments, the housing element 410 is formed of electrically conductive material(s) and may be coupled with a selected reference voltage. As shown, the housing element 410 comprises a bezel member that at least partially circumscribes the sensing assembly 405.

In some cases, the housing element 410 may be formed from multiple joined members to circumscribe the sensing assembly 405, and a portion of the housing element 410 is coupled with the selected reference voltage. For example, a mid-frame member 452 of the housing element 410 may be attached with side wall members to form the housing element 410. The mid-frame member 452 may provide additional rigidity to the assembled input device 400, provide additional coupling points for physical attachment to components of the input device 400, etc. The mid-frame member 452 may have a substantially continuous planar shape, or may define one or more openings through which wiring extends to connect components on opposing sides of the mid-frame member. The mid-frame member 452 may be fully or partially constructed from metallic or other conductive materials. In some embodiments, mid-frame member 452 includes a galvanic connection with ground or another voltage reference.

The sensing assembly 405 may be seated against and/or attached with one or more surfaces of the housing element 410, such as a vertical portion (e.g., extending in a plane parallel to the X-Z plane as shown) and/or a horizontal portion (e.g., extending in a plane parallel to the X-Y plane as shown). In some embodiments, the sensing assembly 405 is attached with the housing element 410 through adhesive applied to regions 470A, 470B between cover glass layer 420 and projecting horizontal surfaces 412A, 412B of the housing element 410.

The housing assembly 408 further comprises a rear cover 415 that physically couples with the housing element 410 to enclose one or more elements of the input device 400. In an alternate embodiment, the housing element 410 and the rear cover 415 are formed as a single component. The attached or integrated combination of the housing element 410 with rear cover 415, and seating the sensing assembly 405 against the housing element 410, operates to enclose components of the input device 400 and generally provides the appearance of a fully assembled device 400.

In some embodiments, the top layer 440 of the sensing assembly 405 and the housing assembly 408 (or housing element 410) define a volume 475, and one or more layers of the sensing assembly 405 extend into the volume 475. In some embodiments, a dielectric layer 435 is disposed within the volume 475 between the sensing assembly 405 and the housing element 410. In one embodiment, the dielectric layer 435 physically contacts a bottom surface 450 of the sensing assembly 405 and a mid-frame surface 455. In another embodiment, one or more conductive layers are disposed between the dielectric layer 435 and the mid-frame surface 455. For example, at least a portion of the sensing assembly 405 may be disposed within a conductive layer that is between the mid-frame surface 455 and dielectric layer 435. The dielectric layer 435 is formed of any compressible material(s) having suitable electrically insulative properties. In some embodiments, the dielectric layer 435 comprises a compressible gel or foam. In other embodiments, the dielectric layer 435 comprises an air gap.

Within input device 400, a bottom surface of the mid-frame member 452 and surfaces of the rear cover 415 define a second volume 480. In some embodiments, a printed circuit board assembly (PCBA) 460 and a battery 465 are disposed within the second volume 480. Although not shown, the PCBA 460 and/or battery 465 may be mounted on one or more structural components included within the second volume 470. The PCBA 460 is generally powered by the battery 465 and generally includes some or all of the processing system 110 (e.g., the sensor module 310, display driver module 320, and/or determination module 330 shown in FIG. 3).

Generally, the sensing assembly 405 includes a plurality of sensor electrodes that are configured to be driven, and the resulting signals can be measured to determine a force applied to the top surface 445 by an input object 140. When a force is applied, the sensing assembly 405 generally deflects downward (due to a bending of the cover glass layer 420 and/or a compression of the regions 470A, 470B), which causes a displacement of one or more layers of the sensing assembly 405 within the volume 475. Generally, the displacement causes a change in capacitance between sensor electrode(s) included within the sensing assembly 405 and the housing element 410. In some embodiments, the change in capacitance may be measured and used to determine a location and/or amount of force applied to the top surface 445.

The accuracy of force sensing measurements for the input device 400 depends on the mechanical accuracy of the mounting of the layers of the sensing assembly 405 relative to the housing element 410, as well as the how well the thicknesses of the various layers are controlled during manufacturing. These parameters will generally vary between different input devices 400, and may further change over time. In various embodiments discussed herein, a thickness profile of the dielectric layer 435 may be determined that reflects the parameters. The thickness profile may generally be used to compensate force measurements acquired using sensor electrodes of the sensing assembly 405, and/or to independently perform force measurements. In some embodiments, the thickness profile is determined based on a baseline capacitive measurement acquired using the sensor electrodes while a conductive reference element 454 is coupled with a selected reference voltage.

Capacitive measurements acquired by a plurality of sensor electrodes of the input device 400 can reflect a plurality of capacitive components. In some embodiments, capacitive measurements include a capacitance $C_{display}(x, y)$ representing a capacitance from a sensor electrode at coordinates (x,y) to one or more conductive structures in the sensing assembly 405, e.g., source lines and gate lines included in the LCD layer 425. In some embodiments, capacitive measurements further include a capacitance $C_{housing}(x, y)$ representing a capacitance from a sensor electrode at coordinates (x,y) to one or more conductive structures outside of the sensing assembly 405, such as the conductive reference element 454. Generally, the conductive reference element 454 represents a nearest conductive surface to the bottom surface 450 of the sensing assembly 405, and more specifically, to a conductive layer of the sensing assembly 405 nearest the bottom surface 450. While in some cases the conductive reference element 454 may be substantially planar (which more closely approximates a parallel-plate capacitance with the sensing assembly 405), other configurations of the conductive reference element 454 are possible. In some embodiments, the conductive reference element 454 comprises a portion of the housing element 410, such as the mid-frame member 452. In other embodiments, the conductive reference element 454 comprises a conductive layer (e.g., including sensor electrodes) disposed between the dielectric layer 435 and the housing element 410.

In some embodiments, capacitive measurements further include a capacitance $C_{ASIC}(x,y)$ representing an unguarded capacitance of the processing system, which is coupled with the sensor electrode at coordinates (x,y). For example, the processing system may include an analog front-end (AFE) channel measuring the sensor electrode, and the capacitance $C_{ASIC}(x, y)$ reflects a capacitance to a conductive pad and/or internal routing to the sensor electrode.

When the conductive reference element 454 (e.g., the mid-frame member 452) is coupled with a ground reference voltage, an absolute baseline capacitive measurement that is measured at a sensor electrode at coordinates (x,y) can be represented as shown in Equation (1):

$$C_{baseline}(x,y,\text{GND}) = C_{display}(x,y) + C_{housing}(x,y) + C_{ASIC}(x,y) \quad (1)$$

When the conductive reference element 454 (e.g., the mid-frame member 452) is coupled with a guarding signal, the capacitance $C_{housing}(x, y)$ is mitigated when the sensor electrodes are driven with a corresponding modulated signal. An absolute baseline capacitive measurement that is measured at the sensor electrode at coordinates (x,y) can thus be represented as shown in Equation (2):

$$C_{baseline}(x,y,\text{GUARD}) = C_{display}(x,y) + C_{ASIC}(x,y) \quad (2)$$

Using the two capacitive measurements, the capacitance $C_{housing}(x,y)$ can be isolated and determined as shown in Equation (3):

$$C_{housing}(x,y) = dC_{baseline}(x,y) = C_{baseline}(x,y,\text{GND}) - dC_{baseline}(x,y,\text{GUARD}) \quad (3)$$

For a sensor electrode located at coordinates (x,y), the capacitance $C_{housing}(x,y)$ can be approximated using a parallel-plate model of a capacitor. Assuming that the dimensions of the layers of the sensing assembly 405 between the sensor electrodes and the conductive reference element 454 are relatively well-controlled (i.e., relative to a distance between the sensing assembly 405 and the conductive reference element 454), a nominal thickness and a dielectric constant of each layer in the sensing assembly 405 are known. Thus, assuming that the layer(s) of the sensing assembly 405 between the sensor electrodes and the bottom surface 450 are substantially flat (i.e., a thickness $d_{sens}(x,y) = d_{sens}$) the collective dielectric constant of the layer(s) may be represented as $\varepsilon_{sens}$. Further, the dielectric layer 435 disposed between the bottom surface 450 and the mid-frame surface 455 may be assumed to have a spatially uniform dielectric constant $\varepsilon_{diel}(x,y) = \varepsilon_{diel}$ and a thickness profile $d_{diel}(x,y)$. The capacitance $C_{housing}(x,y)$ may be represented as shown in Equations (4) and (5):

$$C_{housing}(x, y) = \frac{\varepsilon_{sens} \cdot \varepsilon_{diel} \cdot \varepsilon_0 \cdot A}{\varepsilon_{sens} \cdot d_{diel}(x, y) + \varepsilon_{diel} \cdot d_{sens}(x, y)} \quad (4)$$

$$C_{housing}(x, y) \cdot d_{diel}(x, y) = \frac{\varepsilon_{sens} \cdot \varepsilon_{diel} \cdot \varepsilon_0 \cdot A - C_{housing}(x, y) \cdot \varepsilon_{diel} \cdot d_{sens}(x, y)}{C_{housing}(x, y) \cdot \varepsilon_{sens}}, \quad (5)$$

where A represents an area of the sensor electrode.

Assuming that the bottom surface 450 of the sensing assembly 405 is planar, the bottom surface 450 can have a tilt relative to the mid-frame surface 455, which can be represented as shown in Equation (6):

$$d(x,y) = a \cdot x + b \cdot y + c \quad (6)$$

The coefficients for the plane can be found by a least squares fit, as shown in Equation (7):

$$\begin{bmatrix} a \\ b \\ c \end{bmatrix} = \begin{bmatrix} x_1 & y_1 & 1 \\ \vdots & \vdots & \vdots \\ x_{NumPixels} & y_{NumPixels} & 1 \end{bmatrix} \backslash \begin{bmatrix} d_1 \\ \vdots \\ d_{NumPixels} \end{bmatrix}, \quad (7)$$

where the sensor electrodes are numbered according to i=1 . . . NumPixels: $(x_i,y_i)$ which defines $d_i=d_{diel}(x_i, y_i)$. As the previous discussion shows, performing different capacitive measurements while the conductive reference element 454 is coupled with different reference voltages can be used to isolate the capacitive contribution of the conductive reference element 454 and thereby determine a thickness profile of the dielectric layer 435.

FIGS. 5A and 5B illustrate exemplary implementations for applying a selected reference voltage to a conductive reference element, according to embodiments described herein. For example, arrangements 500, 530 are intended to be used in conjunction with various embodiments discussed herein.

In arrangement 500, the input device 400 is coupled with an external device 505. In some embodiments, the external device 505 represents a testing device that is connected with the input device 400 during a manufacturing and testing process. The external device 505 comprises a processing system 510 that is communicatively coupled through connection 520 with the processing system 110 of the input device 400.

The processing system 510 is configured to apply a selected one (REF 1, REF 2, . . . , REF n) of a plurality of reference voltages 515 to connection 525, which is coupled with the conductive reference element 454. In some embodiments, the plurality of reference voltages 515 includes one or more reference voltages that are also generated by the processing system 110 during its operation. In other embodiments, the reference voltages 515 are different from reference voltages generated by the processing system 110.

In one embodiment, a first reference voltage REF1 of the plurality of reference voltages 515 comprises one of a ground, a floating voltage, and a guarding signal. A second reference voltage REF2 comprises a ground. The plurality of reference voltages 515 may comprise other reference voltages, such as predefined direct current (DC) and/or alternating current (AC) voltages.

In some embodiments, the processing system 110 is configured to perform a first capacitive measurement while the first reference voltage REF 1 is coupled with the conductive reference element 454, and to perform a second capacitive measurement while the second reference voltage REF 2 is coupled with the conductive reference element 454. To accomplish this, the processing system 110 may communicate with the processing system 510 over the connection 520 to determine which of the plurality of reference voltages 515 is being applied to the conductive reference element 454.

In some embodiments, a thickness profile of the dielectric layer is determined by the processing system 110 based on the first capacitive measurement and the second capacitive measurement. The determined thickness profile may be stored within a memory of the processing system 110. Further, based on the determined thickness profile, one or more force-sensing parameters for the processing system 110 may be set. In an alternate embodiment, the first capacitive measurement and the second capacitive measurement are performed using the processing system 510 of the external device 505. In another alternate embodiment, the processing system 510 determined the thickness profile and communicates the thickness profile and/or force-sensing parameters via connection 520 to the processing system 110.

In the arrangement 530, the input device 400 comprises a switching element 545 that is configured to couple the conductive reference element 454 with a selected reference voltage REF 1, REF 2, . . . , REF n. The processing system 110 controls the switching element 545 via control signals transmitted over connection 550. The switching element 545 comprises any suitable logic for coupling a selected reference voltage REF 1, REF 2, . . . , REF n with the conductive reference element 454. In one non-limiting example, the switching element 545 comprises a multiplexer. Further, although depicted as external to the processing system 110, the switching element 545 may alternately be included within the processing system 110.

In alternate embodiments, an external device 505 controls operation of the switching element 545. For example, a state of the switching element 545 may be controlled by a mechanical contact or mechanically-applied contact, and the processing system 510 communicates a signal indicating the state of the switching element via the connection 520. Based on the signal, the processing system 110 knows which reference voltage is (or will be) applied to the conductive reference element 454, and may acquire capacitive measurements as discussed herein.

Processing system 110 comprises a plurality of predefined processing modes 535-1, 535-2, . . . . In some embodiments, the processing system 110 in a first processing mode 535-1 acquires capacitive measurements after controlling the switching element 545 to couple conductive reference element 454 with reference voltage REF 1. In a second processing mode 535-2, the processing system 110 acquires capacitive measurements after controlling the switching element 545 to couple the conductive reference element 454 with reference voltage REF 2. For example, in the first processing mode 535-1 the processing system 110 performs proximity sensing using the plurality of sensor electrodes, and couples the conductive reference element 454 with ground (REF 1). In the second processing mode 535-2, the processing system 110 performs thickness profile sensing and/or force sensing using the plurality of sensor electrodes, and couples the conductive reference element 454 with a guarding signal or floating voltage (REF 2). Other predefined processing modes are also possible.

The input device 400 may include one or more other sensors supporting additional functionality of the processing system 110. In one embodiment, the input device 400 further comprises an inertial sensor 555 connected to the processing system 110 through connection 560. Based on signals provided from the inertial sensor 555, the processing system 110 determines whether a predefined stress event 540 has occurred to the input device 400. The stress event 540 corresponds to a significantly increased likelihood that the positioning of the sensing assembly (or, at the very least, one of the plurality of sensor electrodes) has changed relative to the conductive reference element 454. Generally, changes occurring to the relative positioning of the sensing assembly and the conductive reference element 454 indicates that subsequent force sensing measurements will have reduced accuracy. In some embodiments, determining the stress event 540 has occurred causes the processing system 110 to acquire capacitive measurements suitable to determine an updated thickness profile of the dielectric layer. As discussed above, performing thickness profile sensing may include coupling the conductive reference element 454 with the second reference voltage REF 2.

Figure 6:
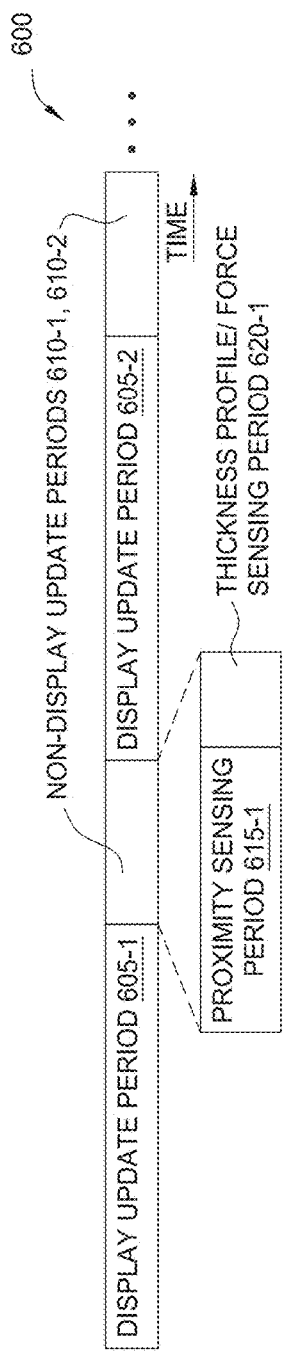
FIG. 6 illustrates an exemplary timing diagram for performing thickness profile sensing with a predetermined periodicity, according to embodiments described herein.

In some embodiments, the processing system 110 is configured to periodically determine a thickness profile of the dielectric layer for performing force sensing and/or compensating force sensing measurements. For example, the processing system 110 may operate the switching element 545 to couple the conductive reference element 454 with the second reference voltage REF 2 with a predefined periodicity. FIG. 6 illustrates an exemplary timing diagram 600 for performing thickness profile sensing with a predetermined periodicity, according to embodiments described herein. Within timing diagram 600, a first display update period 605-1 is followed by a first non-display update period 610-1, and a second display update period 605-2 is followed by a second non-display update period 610-2. In some embodiments, during each display update period 605-1, 605-2, a display driver module of the processing system updates portions of a display frame. In some embodiments, during each non-display update period 610-1, 610-2, a sensing module of the processing system acquires capacitive measurements for proximity sensing, force sensing, and so forth. In one non-limiting example, each display update period 605-1, 605-2 corresponds to an update of a display line of the display frame, and each non-display update period 610-1, 610-2 corresponds to a horizontal blank (H-blank) period. In another non-limiting example, each display update period 605-1, 605-2 corresponds to an update of a plurality of display lines, and each non-display update period 610-1, 610-2 corresponds to a long H-blank period.

As shown, the non-display update period 610-1 includes a proximity sensing period 615-1 and a thickness profile/force sensing period 620-1. Non-display update period 610-2 may include comparable periods. Within the proximity sensing period 615-1, the processing system operates the switching element in a first switching state that couples the conductive reference element with a first reference voltage. Within the thickness profile/force sensing period 620-1, the processing system operates the switching element in a second switching state that couples the conductive reference element with a second reference voltage. In this way, the processing system operates the switching element to couple the conductive reference element with the second reference voltage with a predefined periodicity.

Although the timing diagram 600 illustrates an exemplary timing in which display updating, proximity sensing, and thickness profile sensing are performed during non-overlapping time periods, in alternative embodiments the processing device may perform some or all of these functions during overlapping time periods.

Figure 7:
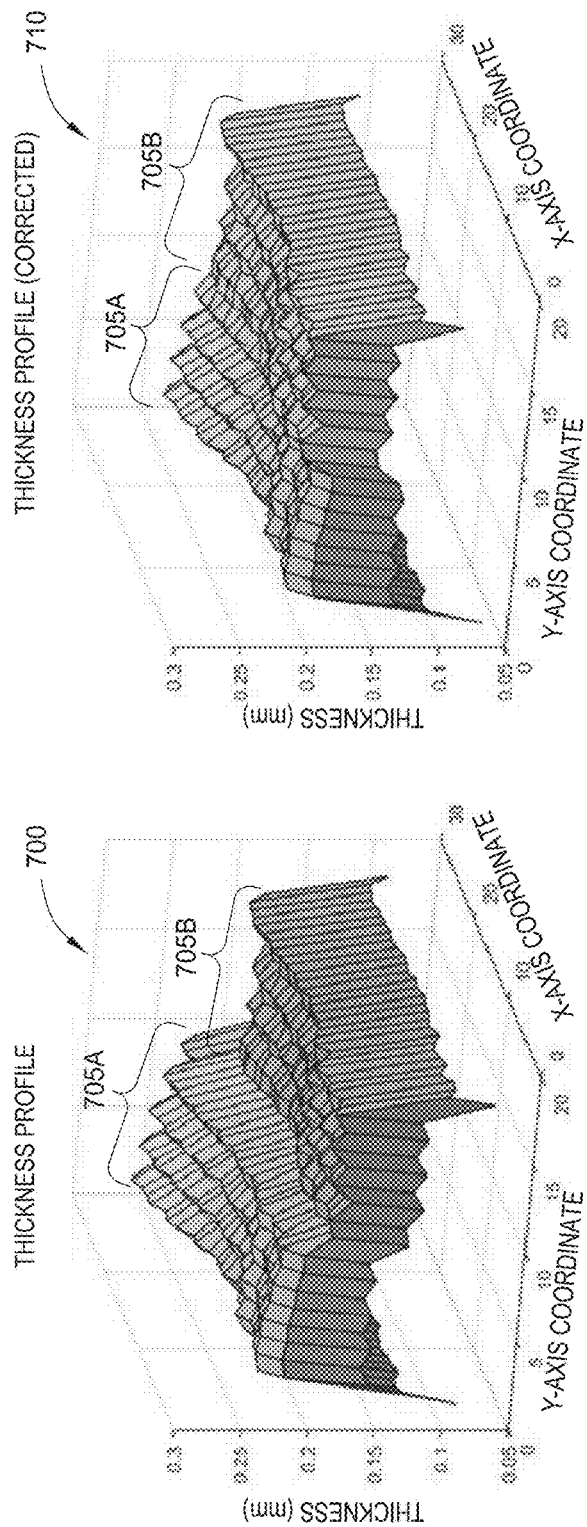
FIG. 7 illustrates an exemplary thickness profile correction operation, according to embodiments described herein.

FIG. 7 illustrates an exemplary thickness profile correction operation, according to embodiments described herein. More specifically, plots 700, 710 illustrate a thickness of the dielectric layer (corresponding to the Z-axis) in millimeters (mm) plotted against X-axis and Y-axis coordinates for the plurality of sensor electrodes. Within plot 700, the portions 705A and 705B include a discontinuity substantially along Y-axis coordinate 10, which could reflect different AFEs used to acquire portions 705A, 705B. In some embodiments, the thickness values of portion 705A are shifted down and/or the thickness values of portion 705B are shifted up, such that the portions 705A, 705B appear substantially continuous. For example, as shown in plot 710, the thickness values of portion 705A are shifted down and the thickness values of portion 705B are shifted up, such that the portions 705A, 705B of plot 710 appear substantially continuous at a midpoint of the distance between the discontinuous portions 705A, 705B of plot 700.

Figure 8:
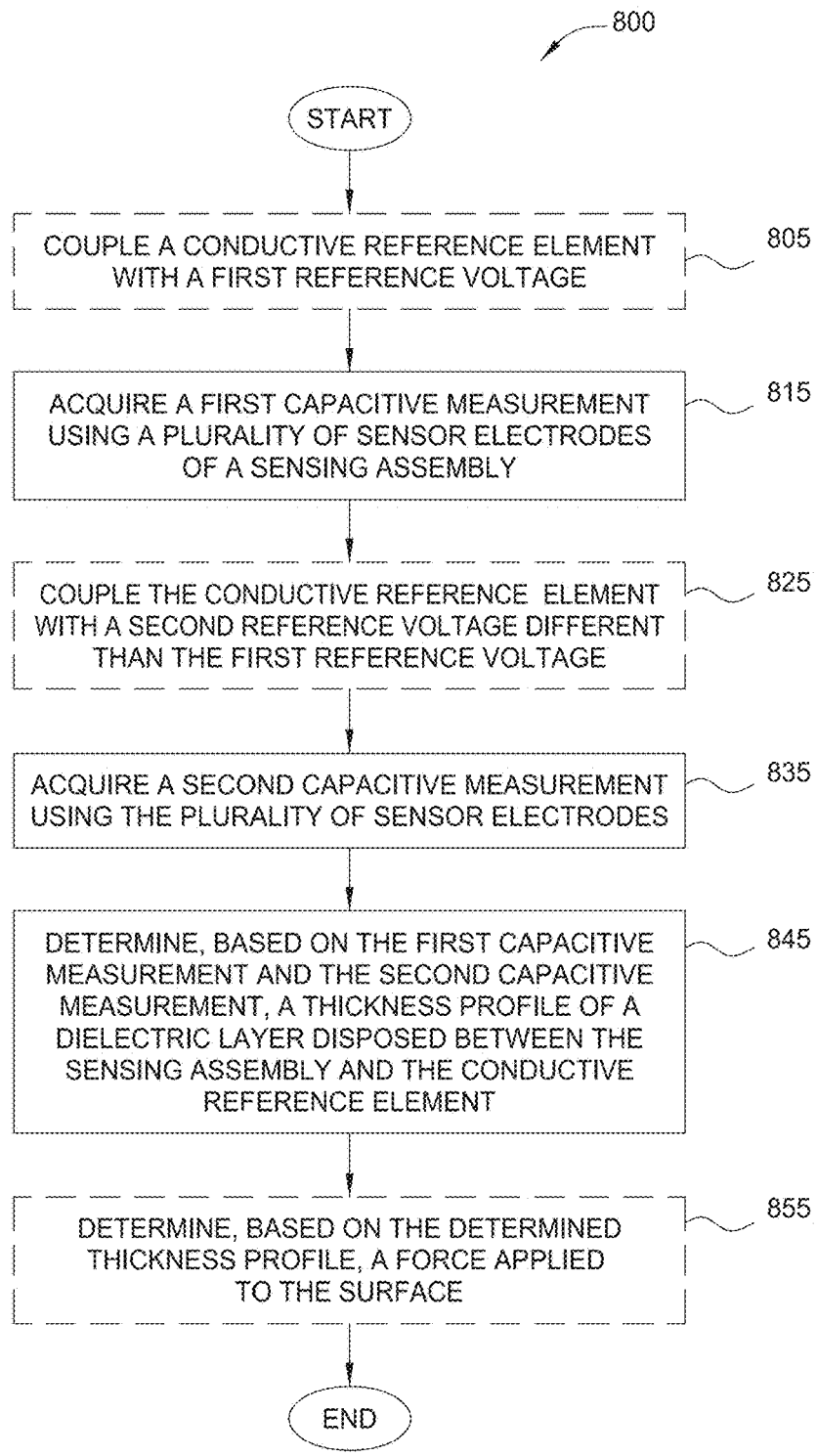
FIG. 8 illustrates a method of determining a thickness profile for a dielectric layer within an input device, according to embodiments described herein.

FIG. 8 illustrates a method 800 of determining a thickness profile for a dielectric layer within an input device, according to embodiments described herein. The method 800 may generally be performed in conjunction with any of the embodiments discussed herein. For example, the method 800 may be performed such as the processing system 110 of an input device 400 and/or the processing system 510 of an external device 505 coupled with the input device 400, which are discussed above with respect to FIGS. 5A, 5B.

Method 800 begins at an optional block 805, where the processing system couples a conductive reference element with a first reference voltage. At block 815, the processing system acquires a first capacitive measurement using a plurality of sensor electrodes of a sensing assembly. In some embodiments, the first capacitive measurement corresponds to performing thickness profile sensing or force sensing using the plurality of sensor electrodes, and the first reference voltage comprises one of a ground, a floating voltage, and a guarding signal.

At an optional block 825, the processing system couples the conductive reference element with a second reference voltage. At block 835, the processing system acquires a second capacitive measurement using the plurality of sensor electrodes. In some embodiments, the second capacitive measurement corresponds to performing proximity sensing using the plurality of sensor electrodes, and the second reference voltage comprises a ground.

At block 845, the processing system determines, based on the first capacitive measurement and the second capacitive measurement, a thickness profile of a dielectric layer disposed between the sensing assembly and the conductive reference element. At optional block 855, the processing system determines, based on the determined thickness profile, a force applied to the surface. Method 800 ends following completion of block 845 or block 855.

Figure 9:
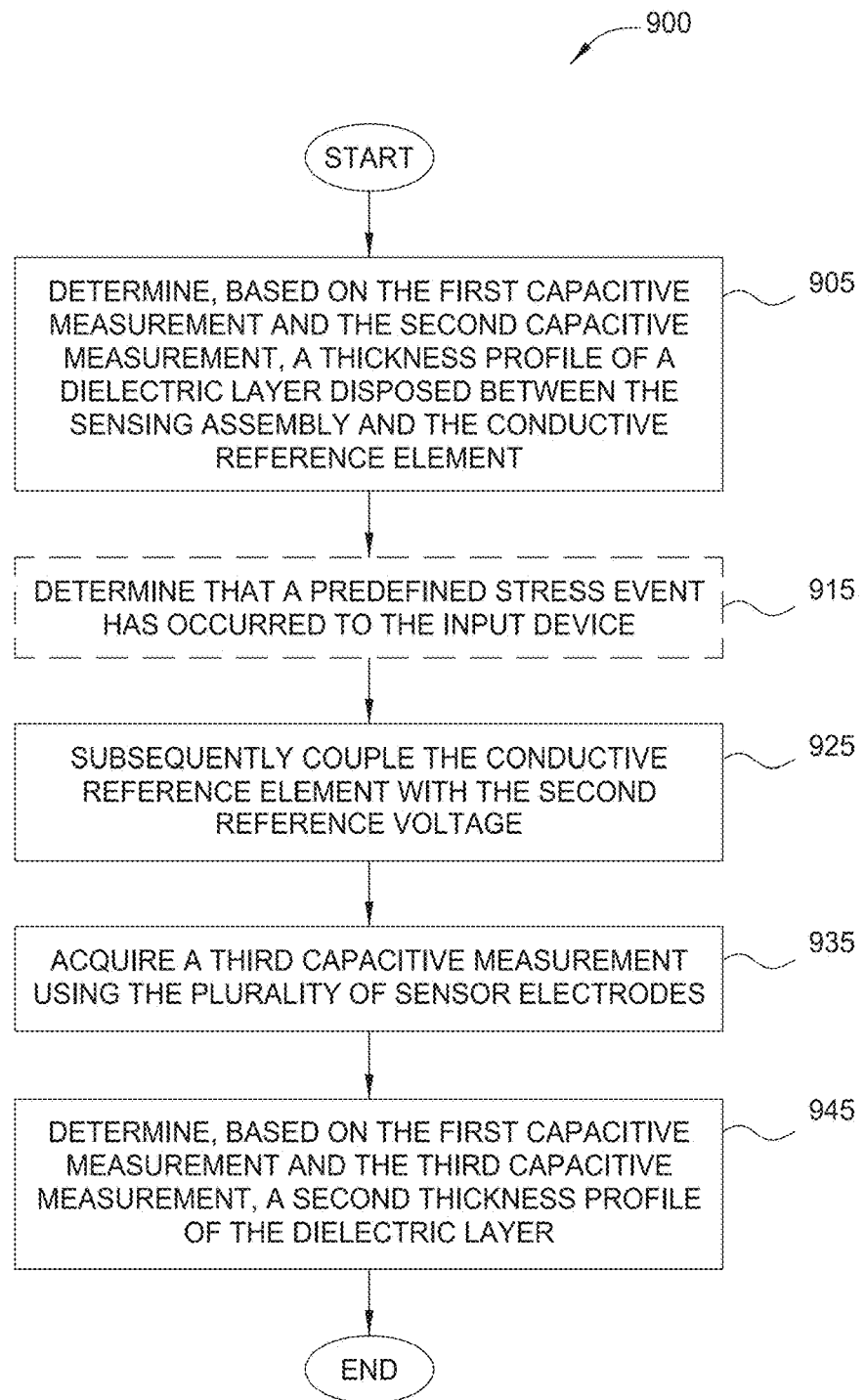
FIG. 9 illustrates a method of determining an updated thickness profile for a dielectric layer within an input device, according to embodiments described herein.

FIG. 9 illustrates a method 900 of determining an updated thickness profile for a dielectric layer within an input device, according to embodiments described herein. The method 900 may generally be performed in conjunction with any of the embodiments discussed herein. For example, the method 900 may be performed such as the processing system 110 of an input device 400 and/or the processing system 510 of an external device 505 coupled with the input device 400, which are discussed above with respect to FIGS. 5A, 5B. Further, method 900 may be performed in sequence with method 800 of FIG. 8.

Method 900 begins at block 905, where the processing system determines, based on the first capacitive measurement and the second capacitive measurement, a thickness profile of a dielectric layer disposed between the sensing assembly and the conductive reference element. Generally, block 905 may overlap with block 845 of method 800 discussed above.

At optional block 915, the processing system determines that a predefined stress event has occurred to the input device. In some embodiments, the processing system makes this determination based on signals received from an inertial sensor of the input device.

At block 925, the processing system subsequently couples the conductive reference element with the second reference voltage. In some embodiments, coupling the conductive reference element with the second reference voltage is performed responsive to determining that a predefined stress event has occurred. In other embodiments, coupling the conductive reference element with the second reference voltage is performed with a predefined periodicity. At block 935, the processing system acquires a third capacitive measurement using the plurality of sensor electrodes. At block 945, the processing system determines, based on the first capacitive measurement and the third capacitive measurement, a second thickness profile of the dielectric layer. In some embodiments, the second thickness profile is used to improve the accuracy of subsequent force sensing measurements. Method 900 ends following completion of block 945.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

I claim:

1. An input device comprising:
a sensing assembly attached with a conductive reference element, the sensing assembly comprising a plurality of sensor electrodes capacitively coupled with the conductive reference element and defining a surface;
a switching element configured to couple the conductive reference element with a selected one of a plurality of reference voltages; and
a processing system configured to:
acquire, while the switching element couples the conductive reference element with a first reference voltage of the plurality of reference voltages, a baseline capacitive measurement using the plurality of sensor electrodes, and
perform, while the switching element couples the conductive reference element with a second reference voltage of the plurality of reference voltages, and based on the baseline capacitive measurement, capacitive sensing using the plurality of sensor electrodes to thereby determine a deflection of the sensing assembly in response to force applied to the surface.

2. The input device of claim 1, further comprising:
a housing assembly attached with the sensing assembly and having a predefined arrangement with the conductive reference element,
wherein the sensing assembly extends into a volume defined between a top layer of the sensing assembly and the housing assembly, wherein the processing system is further configured to:
determine, based on the baseline capacitive measurement, a plurality of thickness values for a dielectric layer disposed within the volume between the sensing assembly and the conductive reference element.

3. The input device of claim 2, wherein the dielectric layer comprises an air gap separating the sensing assembly and the conductive reference element.

4. The input device of claim 2, wherein a housing element of the housing assembly comprises the conductive reference element.

5. The input device of claim 1, wherein the switching element is operated by the processing system.

6. The input device of claim 1, wherein the second reference voltage comprises a ground.

7. The input device of claim 1, wherein the first reference voltage comprises one of a ground, a floating voltage, and a guarding signal.

8. The input device of claim 1, wherein the sensing assembly further comprises a plurality of display electrodes, wherein at least one of the plurality of sensor electrodes comprises at least one of the plurality of display electrodes.

9. A method performed in conjunction with an input device comprising a sensing assembly attached with a conductive reference element, the sensing assembly comprising a plurality of sensor electrodes capacitively coupled with the conductive reference element, the method comprising:
acquiring, while the conductive reference element is coupled with a first reference voltage, a first capacitive measurement using the plurality of sensor electrodes;
acquiring, while the conductive reference element is coupled with a second reference voltage different than the first reference voltage, a second capacitive measurement using the plurality of sensor electrodes; and
determining, based on the first capacitive measurement and the second capacitive measurement, a thickness profile of a dielectric layer disposed between the sensing assembly and the conductive reference element.

10. The method of claim 9, wherein the sensing assembly defines a surface, the method further comprising:
determining, based on the determined thickness profile, a force applied to the surface.

11. The method of claim 9, wherein the input device comprises a housing assembly attached with the sensing assembly and having a predefined arrangement with the conductive reference element, wherein a housing element of the housing assembly comprises the conductive reference element.

12. The method of claim 9, wherein an external device couples, through a switching element, the conductive reference element with a selected one of the first reference voltage and the second reference voltage, the method further comprising:
receiving a signal indicating a state of the switching element.

13. The method of claim 9, wherein the input device further comprises a switching element and a processing system coupled with the plurality of sensor electrodes, wherein the processing system:
operates, within a first predefined processing mode for performing proximity sensing using the plurality of sensor electrodes, the switching element in a first predefined switching state that couples the conductive reference element with the first reference voltage; and
operates, within a second predefined processing mode for acquiring thickness measurements of the dielectric layer, the switching element in a second predefined switching state that couples the conductive reference element with the second reference voltage.

14. The method of claim 13, wherein the second reference voltage comprises one of a floating voltage and a guarding signal.

15. The method of claim 9, further comprising:
subsequently coupling the conductive reference element with the second reference voltage;
acquiring a third capacitive measurement using the plurality of sensor electrodes; and
determining, based on the first capacitive measurement and the third capacitive measurement, a second thickness profile of the dielectric layer.

16. The method of claim 15, wherein subsequently coupling the conductive reference element with the second reference voltage occurs responsive to determining that a predefined stress event has occurred to the input device.

17. The method of claim 15, wherein subsequently coupling the conductive reference element with the second reference voltage is performed with a predefined periodicity.

18. A processing system for an input device, the processing system comprising:

a sensing module comprising sensing circuitry configured to couple with a plurality of sensor electrodes of a sensing assembly, the sensor electrodes capacitively coupled with a conductive reference element of the input device, wherein the sensing module is configured to:

acquire, while the conductive reference element is coupled with a first reference voltage, a first capacitive measurement using the plurality of sensor electrodes;

acquire, while the conductive reference element is coupled with a second reference voltage different than the first reference voltage, a second capacitive measurement using the plurality of sensor electrodes; and determine, based on the first capacitive measurement and the second capacitive measurement, a thickness profile of a dielectric layer disposed between the sensing assembly and the conductive reference element.

19. The processing system of claim 18, wherein the sensing assembly defines a surface, wherein the sensing module is further configured to:

determine, based on the determined thickness profile, a force applied to the surface.

20. The processing system of claim 18, wherein the sensing module is coupled with a switching element, the sensing module further configured to:

operate, within a first predefined processing mode for performing proximity sensing using the plurality of sensor electrodes, the switching element in a first predefined switching state that couples the conductive reference element with the first reference voltage; and operate, within a second predefined processing mode for acquiring thickness measurements of the dielectric layer, the switching element in a second predefined switching state that couples the conductive reference element with the second reference voltage.

21. The processing system of claim 20, wherein the second reference voltage comprises one of a floating voltage and a guarding signal.

22. The processing system of claim 18, wherein the sensing module is further configured to:

subsequently couple the conductive reference element with the second reference voltage;

acquire a third capacitive measurement using the plurality of sensor electrodes; and determine, based on the first capacitive measurement and the third capacitive measurement, a second thickness profile of the dielectric layer.

23. The processing system of claim 22, wherein subsequently coupling the conductive reference element with the second reference voltage occurs responsive to determining that a predefined stress event has occurred to the input device.

24. The processing system of claim 22, wherein subsequently coupling the conductive reference element with the second reference voltage is performed with a predefined periodicity.

25. The processing system of claim 18, wherein the sensing assembly further comprises a plurality of display electrodes configured to be updated by a display driver module of the processing system, wherein at least one of the plurality of sensor electrodes comprises at least one of the plurality of display electrodes.

26. The processing system of claim 18, wherein an external device couples, through a switching element, the conductive reference element with a selected one of the first reference voltage and the second reference voltage, wherein the sensing module is further configured to:

receive a signal indicating a state of the switching element.

* * * * *